United States Patent
Ivanov et al.

(10) Patent No.: US 10,547,983 B2
(45) Date of Patent: Jan. 28, 2020

(54) CONTROLLING RADIO FINGERPRINT OBSERVATION REPORT COLLECTION

(71) Applicant: HERE Global B.V., Eindhoven (NL)

(72) Inventors: Pavel Ivanov, Tampere (FI); Lauri Aarne Johannes Wirola, Tampere (FI); Jari Tapani Syrjarinne, Tampere (FI); Muhammad Irshan Khan, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/711,292

(22) Filed: Sep. 21, 2017

(65) Prior Publication Data

US 2019/0090096 A1    Mar. 21, 2019

(51) Int. Cl.
*H04W 24/00* (2009.01)
*H04W 4/04* (2009.01)

(52) U.S. Cl.
CPC ........................... *H04W 4/04* (2013.01)

(58) Field of Classification Search
CPC ......... H04W 64/00; H04W 4/04; H04W 4/02; H04W 4/029; H04W 4/043
See application file for complete search history.

(56) References Cited

U.S. PATENT DOCUMENTS

| | | | |
|---|---|---|---|
| 8,688,396 B2 | 4/2014 | Lin et al. | |
| 9,338,592 B1 | 5/2016 | Mahapatra | |
| 9,503,858 B2 | 11/2016 | Palanki et al. | |
| 2011/0018732 A1 | 1/2011 | Cho | |
| 2013/0122935 A1 | 5/2013 | Das | |
| 2014/0141803 A1* | 5/2014 | Marti | H04W 4/043 455/456.2 |
| 2014/0179237 A1 | 6/2014 | Gao et al. | |
| 2014/0364101 A1 | 12/2014 | Do | |
| 2015/0133152 A1 | 5/2015 | Edge et al. | |
| 2015/0237471 A1 | 8/2015 | Li | |
| 2016/0080911 A1 | 3/2016 | Kay | |
| 2017/0188188 A1* | 6/2017 | Kang | H04W 4/029 |

(Continued)

FOREIGN PATENT DOCUMENTS

| | | |
|---|---|---|
| WO | WO2016086993 A1 | 6/2016 |
| WO | WO2016086994 A1 | 6/2016 |
| WO | WO2016087008 A1 | 6/2016 |

OTHER PUBLICATIONS

European Search Report for European Patent Application No. 18195451.2-1206 dated Feb. 12, 2019.

*Primary Examiner* — Khalid W Shaheed
(74) *Attorney, Agent, or Firm* — Lempia Summerfield Katz LLC

(57) ABSTRACT

A method includes obtaining or holding available boundary information representing boundary of an indoor environment for which an indoor radio positioning map is to be updated and/or generated, determining whether a current position of a mobile device is in a vicinity of said indoor environment at least partially based on said boundary information; if it is determined that said current position of said mobile device is in a vicinity of said indoor environment, collecting or triggering collecting radio fingerprint observation reports by said mobile device, wherein said radio fingerprint observation reports are collected for updating and/or generating said indoor radio positioning map. Furthermore, a corresponding apparatus and system are disclosed.

24 Claims, 6 Drawing Sheets

(56) References Cited

U.S. PATENT DOCUMENTS

| | | | |
|---|---|---|---|
| 2017/0223511 A1* | 8/2017 | Jampani | H04B 17/318 |
| 2017/0272911 A1* | 9/2017 | Agrawal | H04W 4/027 |
| 2017/0359796 A1* | 12/2017 | Wirola | H04W 4/04 |
| 2018/0348333 A1* | 12/2018 | Bhatti | G01S 5/0252 |
| 2018/0352379 A1* | 12/2018 | Kong | H04W 4/029 |

* cited by examiner

CONTROLLING RADIO FINGERPRINT OBSERVATION REPORT COLLECTION

FIELD OF THE DISCLOSURE

The disclosure relates to the field of indoor radio positioning and more specifically to collecting radio fingerprint observation reports for updating and/or generation an indoor radio positioning map.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A Bluetooth based positioning solution such as a self-contained positioning system, for instance, may be divided in at least three stages, an installation stage, a training stage and a positioning stage.

In the installation stage, Bluetooth beacons are installed in the environment for which a positioning solution is to be provided.

In the subsequent training stage, learning data are collected. The data may be collected in the form of radio fingerprint observation reports that are based on measurements by mobile devices. A radio fingerprint observation report may indicate a position estimate and measurements taken from the radio interface. The position estimate may be for example GNSS based, sensor-based, or manually inputted. Measurements taken from the radio interface may comprise, by way of example, measured radio signal strengths and an identifier of Bluetooth beacons transmitting the radio signals. The training may be a continuous background process, in which mobile devices of a large number of consumers are continuously reporting collected fingerprint observation reports to a server. Consumers may consent to a participation in such a radio fingerprint observation report collection, if their device is equipped with the needed functionality. This approach is also referred to as crowd-sourcing. Alternatively or in addition, mobile devices may be used for collecting radio fingerprint observation reports in a systematic manner. Collected fingerprint data may be uploaded to a database in a radio positioning server or in the radio positioning cloud, where algorithms may be run to generate radio coverage area models of Bluetooth beacons and/or radio positioning maps for positioning purposes.

In the positioning stage, a mobile device may estimate its current position based on own measurements taken from the radio interface and on the data or a subset of data that is available from the training stage. Coverage area model data or radio positioning map data that has been generated in the training stage may be transferred to mobile devices by a radio positioning server via the Internet as assistance data for use in position determinations. Alternatively, coverage area model data and/or radio positioning map data may be stored in a radio positioning server to which the mobile devices may connect to via the Internet for obtaining a position estimate.

A similar approach could be used for a positioning that is based on other types of terrestrial transmitters or on a combination of different types of terrestrial transmitters.

SUMMARY OF SOME EMBODIMENTS OF THE DISCLOSURE

According to an exemplary aspect of the disclosure, a method is disclosed, wherein the method comprises:
  obtaining or holding available boundary information representing boundary of an indoor environment for which an indoor radio positioning map is to be updated and/or generated;
  determining whether a current position of a mobile device is in a vicinity of the indoor environment at least partially based on the boundary information;
  if it is determined that the current position of the mobile device is in a vicinity of the indoor environment, collecting or triggering collecting radio fingerprint observation reports by the mobile device, wherein the radio fingerprint observation reports are collected for updating and/or generating the indoor radio positioning map.

The disclosed method may be for controlling collecting radio fingerprint observation reports for updating and/or generating the indoor radio positioning map.

The disclosed method may be performed by an apparatus such as the mobile device or an indoor radio positioning server (e.g. which is at least partially responsible for updating and/or generating the indoor radio positioning map). Alternatively, the disclosed method may be performed by a system such as an indoor radio positioning system comprising the mobile device and the indoor radio positioning server. Therein, the mobile device may be any one embodiment of the below disclosed mobile device(s), the indoor radio positioning server may be any one embodiment of the below disclosed indoor radio positioning server(s) and the indoor radio positioning system may be any one of the below disclosed indoor radio positioning system(s).

Examples for a mobile device may be a smartphone, a tablet computer, a notebook computer, a smart watch and a smart band.

The indoor radio positioning server may at least partially serve for generating and/or updating the indoor radio positioning map. The indoor radio positioning server may be part of an indoor radio positioning system. In certain exemplary embodiments of the disclosure, the indoor radio positioning server may be part of a server cloud (e.g. which comprises a plurality of servers) or may be represented by a server cloud (e.g. which comprises a plurality of servers).

The indoor radio positioning map may be configured to enable the mobile device (e.g. a plurality of mobile devices comprising the mobile device) to estimate their position at least partially based on this indoor radio positioning map when the mobile device is located in the indoor environment. For example, the indoor radio positioning map is represented by indoor radio positioning map information which may be transmitted from an indoor radio positioning server to these one or more mobile devices.

The indoor radio positioning map may be a radio coverage map of the indoor environment that is generated and/or updated based on radio fingerprint observation reports as disclosed above. Therein, a radio coverage map of the indoor environment may be understood to represent at least the expected radio coverage of one or more radio nodes that are installed in the indoor environment. For example, the indoor radio positioning map may represent a respective radio coverage model for each of these one or more radio nodes that are installed in the indoor environment. The radio coverage model of such a radio node may describe the area (e.g. the area of the indoor environment) within which a radio signal transmitted or triggered to be transmitted by this radio node is expected to be observable (e.g. receivable with a minimum quality). The real radio coverage of such a radio node may however deviate from the expected radio coverage as described by such a radio coverage model.

A radio coverage model of a radio node may be a hard-boundary model or a soft-boundary model (e.g. a hard-boundary model or a soft-boundary model describing expected radio coverage).

An example for a soft-boundary radio coverage model for a respective radio node may be a parametric radio model. Parameters of such a parametric radio model may be considered to be parameters which enable determination of one or more characteristics of one or more radio signals (e.g. radio positioning support signals) transmitted or triggered to be transmitted by the respective radio node that are expected to be observable at different positions. For example, parameters of such a parametric radio model may represent radio transmission parameters of the parametric radio model. Using radio transmission parameters of the parametric radio model may have the effect that the required amount of information for defining the one or more characteristics of one or more radio signals may be particularly small. An example of a parametric radio model is a path loss model for radio signals (e.g. radio positioning support signals) transmitted or triggered to be transmitted by the respective radio node.

An example for a hard-boundary radio coverage model for a respective radio node may be a geometric model. Information of such a geometric radio model may be considered to be information which (e.g. geometrically) describe (e.g. define) an expected radio coverage of the respective radio node.

By receiving one or more of radio signals of one or more radio nodes that are installed in the indoor environment and/or by evaluating (e.g. measuring) such one or more radio signals, the mobile device may for example determine (e.g. estimate) its position when it is located in the indoor environment by additionally using information representing such an indoor radio positioning map representing radio coverage area models for these one or more radio nodes.

The indoor radio positioning map is for example an indoor radio positioning map of an indoor radio positioning system for the indoor environment. For example, the disclosed method is performed in the learning stage of the indoor radio positioning system for the indoor environment. The indoor radio positioning system may be a self-contained indoor radio positioning system.

The indoor environment may be a predetermined indoor environment.

The indoor environment is for example inside a building or a complex of buildings like a shopping center, a parking garage, an airport, a company site, etc. The boundary of such an indoor environment may for example be understood to be defined by the outside walls of the building or the complex of buildings. Accordingly, the boundary information may represent a two- or three-dimensional model of the outside walls of the building or the complex of buildings. An example of such a two-dimensional model may be a floor plan or a polygon. Additionally, the boundary information may represent the position of the outside walls (i.e. the geographic position). For example, the boundary information may contain one or more geographic coordinates of characteristic features of the outside walls like corners or openings of the outside walls.

In this specification, information may be understood to mean information in encoded form, for example information in the form of data or a signal.

Holding available information may be understood to mean that the information (e.g. information in the form of data) is stored in memory means, for example memory means of the mobile device or the indoor radio positioning server holding available the information. Information could be obtained by receiving the information (e.g. information in the form of a signal), for example by communication means of the mobile device or the indoor radio positioning server obtaining the information, or by capturing the information, for example by a sensor or user input means of an apparatus obtaining the information.

Accordingly, the boundary information may be hold available by being stored in memory means of the mobile device or the indoor radio positioning server. Alternatively or additionally, the boundary information may be obtained by receiving the boundary information (e.g. by communication means of the mobile device or the indoor radio positioning server) or by capturing (e.g. by a sensor or user input means of the mobile device or the indoor radio positioning server) the boundary information.

The current position of the mobile device may represent a position of the mobile device.

The current position of the mobile device may be understood to be the last position that has been determined for the mobile device. The real position of the mobile device may however deviate from the current position of the mobile device.

For example, the current position of the mobile device may be an outdoor position and/or a position outside of the indoor environment, for example outside a building or a complex of buildings which comprises the indoor environment. In other words, the current position of the mobile device may represent a position of the mobile device before the mobile device enters the indoor environment.

The vicinity of the indoor environment may be understood to describe an area outside the indoor environment, for example an area outside the boundary of the indoor environment as represented by the boundary information.

That the determining whether the current position of the mobile device is in the vicinity of the indoor environment is at least partially based on the boundary information may be understood to mean that the boundary of the indoor environment as represented by the boundary information is to be considered when determining whether the current position of the mobile device is in the vicinity of the indoor environment, for example by determining (e.g. calculating) a distance between the boundary of the indoor environment as represented by the boundary information and the current position.

For example, the determining whether the current position of the mobile device is in the vicinity of the indoor environment may be performed according to predetermined rules (e.g. a predetermined algorithm) or predetermined specifications (e.g. a definition of the vicinity of the indoor environment) or a combination thereof.

If it is determined that the current position of the mobile device is in the vicinity of the indoor environment, radio fingerprint observation reports are collected by the mobile device or triggered to be collected by the mobile device. This may be understood to mean that the radio fingerprint observation reports are only collected by the mobile device or only triggered to be collected by the mobile device, if it is determined that the current position of the mobile device is in the vicinity of the indoor environment. This may have the effect that the mobile device starts collecting radio fingerprint observation reports outside of the indoor environment, but close-by the indoor environment. Furthermore, using such boundary information may allow to determine that the mobile device is close-by the indoor environment and, thus, to start collecting radio fingerprint observation reports for the indoor radio positioning map even if the indoor radio positioning map is not available.

Collecting radio fingerprint observation reports by the mobile device may be understood to mean that the mobile device generates the radio fingerprint observation reports at least partially based on scanning results. For example, collecting such a radio fingerprint observation report by the mobile device may comprise scanning for radio signals observable at a observation position of the mobile device and generating a radio fingerprint observation report containing an indication for the radio nodes from which a radio signal is observable at the observation position of the mobile device and an indication of the observation position of the mobile device. A radio signal may be understood to be observable at an observation position of the mobile device if the radio signal is receivable with a minimum quality (e.g. a minimum signal-to-noise ratio and/or a minimum signal power) at this position by the mobile device.

Triggering collecting radio fingerprint observation reports by the mobile device may be understood to mean that the mobile device is caused to collect the radio fingerprint observation reports. For example, the indoor radio positioning server may cause the mobile device to collect the radio fingerprint observation reports (e.g. by transmitting according radio fingerprint observation control information to the mobile device).

According to a further exemplary aspect of the invention, an apparatus is disclosed, wherein the apparatus comprises means for performing the steps of any one embodiment of the disclosed method or a part thereof (e.g. at least some steps of any one embodiment of the disclosed method).

The means of the disclosed apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chips et or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus comprises at least one processor and at least one memory containing computer program code, the at least one memory and the computer program code with the at least one processor configured to cause the apparatus at least to perform any one embodiment of the disclosed method (e.g. the steps of any one embodiment of the disclosed method) or a part thereof (e.g. at least some steps of any one embodiment of the disclosed method).

For example, the disclosed apparatus(es) may be modules or components for a device, for example chips. Alternatively, the disclosed apparatus(es) may be devices. In particular, the disclosed apparatus(es) may be the mobile device and/or the indoor radio positioning server.

As disclosed above, examples for the mobile device may be a smartphone, a tablet computer, a notebook computer, a smart watch and a smart band. The indoor radio positioning server may at least partially serve for generating and/or updating the indoor radio positioning map. The indoor radio positioning server may be part of an indoor radio positioning system. In certain exemplary embodiments of the disclosure, the indoor radio positioning server may be part of a server cloud which comprises a plurality of servers or may be represented by a server cloud which comprises a plurality of servers.

It is to be understood that the disclosed apparatus(es) may comprise only the disclosed components (e.g. means) or may further comprise one or more additional components (e.g. means). Examples of such additional components are a communication interface, a network interface, a radio interface (e.g. a receiver, a transmitter and/or a transceiver), a data interface, a user interface (e.g. a touch-sensitive display, a keyboard, a touchpad, a display, etc.) etc.

According to a further exemplary aspect of the disclosure, a system is disclosed which comprises the mobile device and the indoor radio positioning server.

The system may be an indoor radio positioning system for performing any one embodiment of the disclosed method. For example, the mobile device and the indoor radio positioning server may be configured to cooperate to perform any one embodiment of the disclosed method (e.g. some steps of any one embodiment of the disclosed method may be performed by the mobile device and the other steps may be performed by the indoor radio positioning server).

For example, the mobile device and the indoor radio positioning server of the disclosed system may comprise means for performing the steps of any one embodiment of the disclosed method by cooperating (e.g. some steps of any one embodiment of the disclosed method may be performed by means of the mobile device and the other steps may be performed by means of the indoor radio positioning server). Therein, these means can be implemented in hardware and/or software like the means of the above disclosed apparatus(es).

Alternatively or additionally, each of the mobile device and the indoor radio positioning server of the disclosed system may comprise at least one processor and at least one memory containing computer program code. Therein, the computer program code contained (e.g. stored) in the memories of the mobile device and the indoor radio positioning server may be configured to cause the mobile device and the indoor radio positioning server to cooperate to at least to perform any one embodiment of the disclosed method.

According to a further exemplary aspect of the disclosure, a non-transitory computer readable storage medium is disclosed, in which computer program code is stored. The computer program code causes an apparatus or system to perform any one embodiment of the disclosed method (e.g. the steps of any one embodiment of the disclosed method) when executed by a processor. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the disclosure, a computer program code is disclosed, the computer program code when executed by a processor causing an apparatus or system to perform any one embodiment of the disclosed method (e.g. the steps of any one embodiment of the disclosed method).

The disclosed method, apparatus(es), system, non-transitory computer readable storage medium and computer program code may be for controlling collecting radio finger print information for updating and/or generating the indoor radio positioning map.

In the following, further features and embodiments of these exemplary aspects of the invention will be described.

According to an exemplary embodiment of the disclosure, the radio fingerprint observation reports are collected at least partially based on a status of the indoor radio positioning map or a status of a section of the indoor radio positioning map.

The status of the indoor radio position map may be understood to indicate whether the indoor radio positioning map is complete or whether further training is necessary to complete or update the indoor radio positioning map. Accordingly, the status of the section of the indoor radio position map may be understood to indicate whether the section of the indoor radio positioning map is complete or whether further training is necessary to complete or update the section of the indoor radio positioning map. Therein, the section of the indoor radio positioning map may represent a specific portion of the indoor radio positioning map. For example, the indoor radio positioning map may consist of a plurality of sections.

For example, the status of the indoor radio position map or of the section of the indoor radio position map may be one of the following:
i) not available (e.g. no radio fingerprint observation reports collected);
ii) incomplete (e.g. less than predetermined number of radio fingerprint observation reports collected and/or expected positioning accuracy is less than predetermined positioning accuracy);
iii) complete (e.g. more than predetermined number of radio fingerprint observation reports collected and/or expected positioning accuracy meets or supersedes predetermined positioning accuracy);
iv) outdated (e.g. the radio environment may have changed).

By collecting the radio fingerprint observation reports at least partially based on a status of the indoor radio positioning map or a status of a section of the indoor radio positioning map, a feedback loop may be created which allows to control the amount of radio fingerprint observation reports collected by the mobile device based on the actual needs for updating and/or generating the indoor radio positioning map. In case of a complete indoor radio positioning map and a plurality of mobile devices collecting radio fingerprint observation reports, this may help to significantly reduce the processing load and the storage requirements of the indoor radio positioning server which is at least partially responsible for updating and/or generating the indoor radio positioning map.

In certain embodiments of this exemplary embodiment of the disclosure, the method may comprise:
determining or obtaining or holding available indoor radio positioning map status information indicating at least the status of the indoor radio positioning map or a status of the section of the indoor radio positioning map.

The indoor radio positioning map status information may for example be determined by determining the status of the indoor radio positioning map or the status of the section of the indoor radio positioning map.

As disclosed above, the indoor radio positioning map or the section of the indoor radio positioning map may for example be determined to be not available if no radio fingerprint observation reports (e.g. no radio fingerprint observation reports for a specific radio technology like Bluetooth and/or WLAN) have been collected within the indoor radio positioning map or the section of the indoor radio positioning map.

Furthermore, the indoor radio positioning map or the section of the indoor radio positioning map may be determined to be complete if a predetermined number of radio fingerprint observation reports have been collected within the area covered by the indoor radio positioning map or the section of the indoor radio positioning map. Alternatively or additionally, the indoor radio positioning map or a section of the indoor radio positioning map may be determined to be complete if it is expected that the indoor radio positioning map or the section of the indoor radio positioning map enables a mobile device to estimate its position with a predetermined positioning accuracy when the mobile device is located in the area covered by the indoor radio positioning map or the section of the indoor radio positioning map.

The indoor radio positioning map or the section of the indoor radio positioning map may be determined to be outdated if the radio environment may have changed. This may for example be the case if one or more radio fingerprint observation reports have been collected which are in contrast to the indoor radio positioning map or the section of the indoor radio positioning, for example because a radio node has been moved or switched-off.

The indoor radio positioning map status information may be determined by the indoor radio positioning server which may for example be at least partially responsible for generating and/or updating the indoor radio positioning map.

For example, the indoor radio positioning map status information may be obtained by the mobile device by receiving the indoor radio positioning map status information (e.g. from the indoor radio positioning server).

For example, the indoor radio positioning map status information may be contained (e.g. embedded by the indoor radio positioning server) in indoor radio positioning map information which represent the indoor radio positioning map and which are received by the mobile device from the indoor radio positioning server. This is a simple and efficient solution for providing the indoor radio positioning map status information, because it does not require any additional transmission of information.

Alternatively or additionally, the indoor radio positioning server may provide the indoor radio positioning map status information for retrieval by the mobile device. Accordingly, the mobile device may request the indoor radio positioning map status information from the indoor radio positioning server (e.g. transmit a request for the indoor radio positioning map status information to the indoor radio positioning server) and receive the indoor radio positioning map status information from the indoor radio positioning server in response to the request. For example, the indoor radio positioning server may provide a programming interface (e.g. an application programming interface, API) for retrieval of the indoor radio positioning map status information. Accordingly, the mobile device may use the programming interface to request the indoor radio positioning map status. This is a more generic and flexible solution than embedding the indoor radio positioning map status information in indoor radio positioning map information.

In certain embodiments of this exemplary embodiment of the disclosure, the method may further comprise:
  determining a frequency or an area or a radio technology or a combination thereof for collecting the radio fingerprint observation reports at least partially based on the indoor radio positioning map status information.

The determining a frequency or an area or a radio technology or a combination thereof for collecting the radio fingerprint observation reports may be performed according to predetermined rules and/or predetermined specifications.

The (determined) frequency for collecting the radio fingerprint observation reports may specify the number of radio fingerprint observations reports (e.g. per time and/or per area) that are to be collected by the mobile device. For example, the determined frequency for collecting the radio fingerprint observation reports may for example be a maximum frequency or a minimum frequency or an exact frequency with which the mobile device collects the radio fingerprint observation reports (e.g. scans for radio signals and/or generates the radio fingerprint observation reports). A maximum frequency for collecting radio fingerprint observation reports may mean that as much radio fingerprint observation reports as possible are to be collected; and a minimum frequency for collecting radio fingerprint observation reports may mean that not more than a predetermined number of radio fingerprint observation reports time and/or area are to be collected. For example, if the indoor radio positioning map status information indicate that the indoor radio positioning map is not available or incomplete or outdated, a maximum frequency may be determined for collecting the radio fingerprint observation reports. However, if the indoor radio positioning map status information indicates that the indoor radio positioning map is complete, a minimum frequency may be determined for collecting the radio fingerprint observation reports.

For example, the (determined) area for collecting the radio fingerprint observation reports specifies the area within which radio fingerprint observation reports are to be collected by the mobile device. For example, if the indoor radio positioning map status information indicate that (e.g. only) a section of the indoor radio positioning map is not available or incomplete or outdated, the area (e.g. the area of the indoor environment) represented by this section of the indoor radio positioning map may be determined for collecting the radio fingerprint observation reports.

Furthermore, the (determined) radio technology for collecting the radio fingerprint observation reports may specify the radio technology for which radio fingerprint observation reports are to be collected by the mobile device (e.g. by scanning for radio signals of this radio technology).

It is to be understood that a frequency for collecting the radio fingerprint observation reports or an area for collecting the radio fingerprint observation reports or a radio technology for collecting the radio fingerprint observation reports or a combination thereof may be determined. This determining may for example be performed by the mobile device or the indoor radio positioning server (e.g. which is at least partially responsible for generating and/or updating the indoor radio positioning map).

According to an exemplary embodiment of the disclosure, the method comprises:
  obtaining or holding available radio fingerprint observation control information indicating a frequency or an area or a radio technology or a combination for collecting the radio fingerprint observation reports.

The radio fingerprint observation control information may cause the mobile device to collect the radio fingerprint observation reports according to the indications of the radio fingerprint observation control information (e.g. with the indicated frequency and/or with the indicated area and/or for the indicated radio technology).

For example, the radio fingerprint observation control information may be obtained by the mobile device by receiving the radio fingerprint observation control information (e.g. from the indoor radio positioning server). Alternatively or additionally, the radio fingerprint observation control information may be hold available by being stored in memory means of the mobile device.

The radio fingerprint observation control information may for example be a result of the determining of a frequency or an area or a radio technology or a combination thereof for collecting the radio fingerprint observation reports as disclosed above. If this determining is performed by the indoor radio positioning server, the radio fingerprint observation control information may be contained (e.g. embedded by the indoor radio positioning server) in indoor radio positioning map information which represent the indoor radio positioning map and which are received by the mobile device from the indoor radio positioning server. This is a simple and efficient solution for providing the indoor radio positioning map status information, because it does not require any additional transmission of information.

Alternatively or additionally, the indoor radio positioning server may provide the radio fingerprint observation control information for retrieval by the mobile device. Accordingly, the mobile device may request the radio fingerprint observation control information from the indoor radio positioning server (e.g. transmit a request for the radio fingerprint observation control information to the indoor radio positioning server) and receive the radio fingerprint observation control information from the indoor radio positioning server in response to the request. For example, the indoor radio positioning server may provide a programming interface (e.g. an application programming interface) for retrieval of the radio fingerprint observation control information. Accordingly, the mobile device may use the programming interface to request the radio fingerprint observation control information. This is a more generic and flexible solution than embedding radio fingerprint observation control information in indoor radio positioning map information.

According to an exemplary embodiment of the disclosure, each of the radio fingerprint observation reports indicates an observation position and one or more respective radio nodes from which radio signals are observable at the observation position by the mobile device.

As disclosed above, collecting radio fingerprint observation reports by the mobile device may be understood to mean that the mobile device generates the radio fingerprint observation reports at least partially based on scanning results. For example, collecting such a radio fingerprint observation report by the mobile device may comprise scanning for radio signals observable at a observation position of the mobile device and generating a radio fingerprint observation report containing an indication for the radio nodes from which a radio signal is observable at the observation position of the mobile device and an indication of the observation position of the mobile device.

Optionally, the mobile device (e.g. the communication interface of the mobile device) may determine (e.g. measure) receiving parameters like a received signal strength of the radio signals observable at the observation position when scanning for radio signals. The radio fingerprint observation report may then indicate these receiving parameters (e.g. measured received signal strengths for the radio signals observable at the observation position).

The observation position may for example be determined based on user input and/or based on the indoor radio positioning map and/or based on information enabling determination of the observation position (e.g. sensor information captured by one or more sensors). Each of the radio fingerprint observation reports may contain an indication of the respective observation position at which the mobile device scanned for radio signals and an indication of the one or more respective radio nodes from which radio signals were observable by the mobile device when scanning for radio signals at the observation position.

An indication of a position may be understood to be a representation of the position (e.g. in the form of positioning and/or geographic coordinates). Alternatively or additionally, an indication of a position may be understood to represent information enabling determination of the position (e.g. sensor information captured by one or more sensors). An example of an indication for a radio node may be an identifier of the radio node like a name, an address (e.g. a MAC address or an IP address), an universally unique identifier (UUID), a service set identifier (SSID), a basic service set identifier (BSSID), or a combination thereof.

For example, at least one radio node of the one or more radio nodes may be part of the system (e.g. the indoor radio positioning system). In particular, the system may comprise a plurality of such radio nodes (e.g. all of the one or more radio nodes).

At least one radio node of the one or more respective radio nodes may be one of:
a Bluetooth beacon;
a Bluetooth beacon enabling Bluetooth low energy (BLE) mode;
a Bluetooth low energy (BLE) beacon; and
a wireless local area network (WLAN) access point and/or router.

The beacons may comprise a Bluetooth and/or BLE radio interface, which includes at least a Bluetooth and/or BLE transmitter. The Bluetooth and/or BLE transmitter may also be a part of a Bluetooth and/or BLE transceiver. The Bluetooth and/or BLE radio interface may be configured to transmit Bluetooth and or BLE radio signals.

Such beacons can be easily installed at various installation positions and require little to no maintenance. For example, a plurality of beacons may be easily distributed across a certain area and may cover a certain area (e.g. the area of the indoor environment) with radio signals transmitted (e.g. broadcasted) by the beacons. Also, Bluetooth technologies are supported by many mobile devices by default such as most smartphones, most tablet computers, most notebook computers, most smart watches and most smart bands, etc. Using Bluetooth beacons and/or BLE beacons may thus have the effect that the many mobile devices may use the indoor radio positioning map (e.g. the indoor radio positioning map of the indoor radio positioning system) without any adaptation of hardware. As a result, the approach may be globally scalable and have low maintenance and deployment costs. In addition, regarding positioning utilizing received signal strength (RSS) the end-user experience may be acceptable with these technologies, since a horizontal positioning accuracy of 2 to 3 meters as well as a high reliability in floor detection may be achieved. The beacons may be stand-alone devices or be integrated into or attached to some other device. For instance, a radio positioning support device may be a Bluetooth tag or token or a part thereof comprising such a beacon. Bluetooth beacons, in particular in low energy mode, require comparably little energy and the use of Bluetooth low energy may enable a positioning with limited energy consumption at all involved devices.

A Bluetooth beacon that is employed for the disclosure may be any kind of Bluetooth beacon complying with any present or future standard. The Bluetooth standards are specified by the Bluetooth Special Interest Group and are presently available under https://www.bluetooth.com/.

It is to be understood, however, that other types of radio nodes than variations of Bluetooth beacons may be used as well, for instance tags or other devices that are configured to transmit ultra-wideband (UWB) signals or any wireless radio signals that might emerge in the future. For example, one or more radio nodes of the one or more respective radio nodes may be an access point and/or a router of a WLAN. Such an access point and/or router of a WLAN may comprise a WLAN radio interface, which for example includes a WLAN transceiver. The WLAN radio interface may be configured to transmit and/or receive WLAN radio signals. Accordingly, the radio signal transmitted by such an access point and/or router of a WLAN may be a WLAN radio signal. WLAN is for example specified by the standards of the IEEE 802.11 family (http://www.ieee.org/).

According to an exemplary embodiment of the disclosure, each of the radio fingerprint observation reports contains or represents information enabling determination of an observation position.

As disclosed above, an observation position indicated by a respective radio fingerprint observation report may describe the position at which the mobile device has scanned for radio signals and based on which scanning results the respective radio fingerprint observation report has been at least partially generated.

The information enabling determination of an observation position may be understood to be an indication of the observation position. Such information enabling determination of an observation position may for example be sensor information captured by one or more sensors like one or more positioning sensors (e.g. an GNSS sensor) and/or one or more inertial sensors (e.g. an accelerometer, a gyroscope, a magnetometer, a barometer, etc.).

By the time when the mobile device collects a radio fingerprint observation report, it may not be possible to determine the observation position based on the indoor radio positioning map, for example because the indoor radio positioning map is not available or incomplete. Furthermore, the observation position of the mobile device may be indoor such that it is not possible to accurately determine the observation position only based on an outdoor positioning system (e.g. an GNSS system). In this case, it may for example beneficial if the mobile device collects further information enabling determination of an observation position like sensor information captured by one or more sensors like one or more positioning sensors (e.g. an GNSS sensor) and/or one or more inertial sensors (e.g. an accelerometer, a gyroscope, a magnetometer, a barometer, etc.). Based on this information, it may be possible to determine (e.g. to estimate or calculate) the observation position. The real observation position of the mobile device may however deviate from such a determined observation position.

For example, the mobile device may determine the observation position based on this information enabling determination of the observation position. Alternatively or additionally, the mobile device may include this information into the radio fingerprint observation report such that for example the indoor radio positioning server can use this information for determining the observation position.

According to an exemplary embodiment of the disclosure, the current position of the mobile device is determined based on an outdoor positioning system. For example, the method may comprise determining the current position of the mobile device based on an outdoor positioning system.

The outdoor positioning system is to be understood to be different from the indoor radio positioning system for the indoor environment as disclosed above. For example, determining a position based on the outdoor positioning system is performed independently from the indoor radio positioning map for the indoor environment.

An example of such an outdoor positioning system may be a Global Navigation Satellite System (GNSS) like the global positioning system (GPS) or the Galileo System. Accordingly, the current position of the mobile device may represent a GNSS position determined (e.g. captured) by a GNSS sensor of the mobile device. It is however to be understood that the present disclosure is not limited to this example of an outdoor positioning system. An alternative example of an outdoor positioning system may be a cellular network based positioning system or an WLAN based positioning system based on an outdoor WLAN radio map.

As disclosed above, the current position of the mobile device may be understood to be the last position that has been determined (e.g. captured by a GNSS sensor) for the mobile device. The real position of the mobile device may however deviate from the current position of the mobile device.

According to an exemplary embodiment of the disclosure, the current position of the mobile device is determined to be in the vicinity of the indoor environment, if a distance between the current position of the mobile device and the boundary of the indoor environment represented by the boundary information is less than a predetermined threshold distance.

According to an exemplary embodiment of the disclosure, wherein the radio fingerprint observation reports are collected inside and outside of the indoor environment.

According to an exemplary embodiment of the disclosure, the method comprises:
  updating or generating or triggering updating or generating the indoor radio positioning map at least partially based on the radio fingerprint observation reports.

According to an exemplary embodiment of the disclosure, the method is performed by the mobile device or by an indoor radio positioning server or by an indoor radio positioning system comprising the mobile device and the indoor radio positioning server.

According to an exemplary embodiment of the disclosure, the mobile device may be part of a plurality of mobile devices. Each mobile device of the plurality of mobile devices may collect radio fingerprint observation reports for updating and/or generating the indoor radio positioning map. Therein, collecting the radio fingerprint observation reports by the plurality of mobile devices may be controlled according to the method. For example, each mobile device of the plurality of mobile devices may at least partially perform the method. Alternatively or additionally, the indoor radio positioning server may at least partially perform the method for controlling collecting the radio fingerprint observation reports by the plurality of mobile devices.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1A:
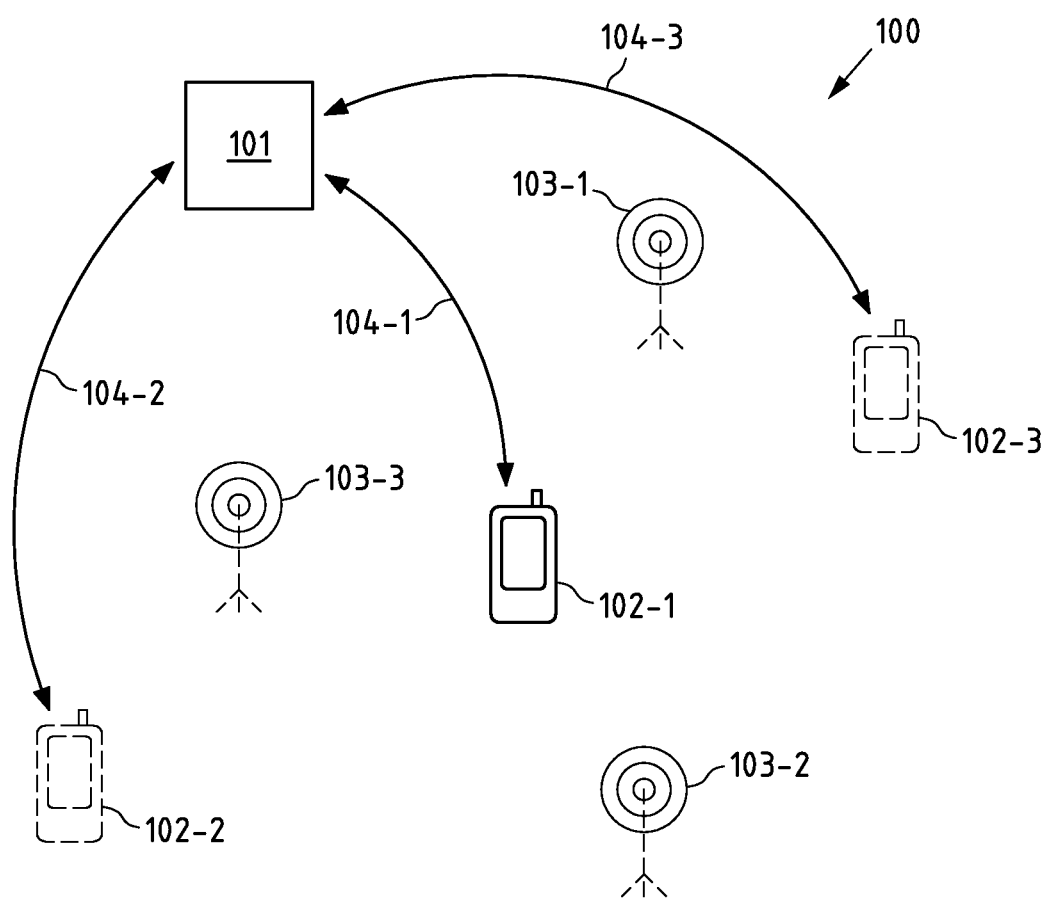
FIG. 1a is a block diagram of an exemplary embodiment of a system according to the disclosure.

FIG. 1a is a schematic high-level block diagram of a system 100 according to an exemplary aspect of the disclosure. In the following, it is assumed that system 100 is an indoor radio positioning system for an indoor environment.

The indoor environment is for example inside a building or a complex of buildings like a shopping center, a parking garage, an airport, a company site, etc.

System 100 comprises an indoor radio positioning server 101 and a mobile device 102-1. Optionally, system 100 may further comprise mobile devices 102-2 and 102-3 (i.e. a plurality of mobile devices 102-1 to 102-3) and a plurality of radio nodes 103-1 to 103-3. It is to be understood that system 100 may comprise further mobile devices and radio nodes. In the following, it is thus referred to mobile devices 102-1 to 102-3 and radio nodes 103-1 to 103-3 without limiting the scope of the invention.

For example, each of mobile devices 102-1 to 102-3 may be one of a smartphone, a tablet computer, a notebook computer, a smart watch and a smart band.

It is to be understood that indoor radio positioning system 100 is not limited to a single indoor radio positioning server 101, but may optionally comprise a plurality of servers (e.g. forming a server cloud). Accordingly, the indoor radio positioning server may be part of such a plurality of servers (e.g. a server cloud) or may be represented by such a plurality of servers (e.g. a server cloud).

Radio nodes 103-1 to 103-3 may be fixedly installed in the indoor environment and may be configured to transmit (e.g. broadcast) radio signals. Such a radio signal transmitted by a respective one of radio nodes 103-1 to 103-3 may contain and/or represent positioning support information. The positioning support information are for example configured to enable mobile devices 102-1 to 102-3 receiving the radio signals to estimate their position at least partially based on these positioning support information. For example, the positioning support information may at least represent an identifier of the respective one of radio nodes 103-1 to 103-3 transmitting the radio signal containing this positioning support information. As disclosed above, examples for an identifier of a radio are a name, an address (e.g. a MAC address or an IP address), an universally unique identifier (UUID), a service set identifier (SSID), a basic service set identifier (BSSID), or a combination thereof.

For example, one or more of radio nodes 103-1 to 103-3 may be a BLE beacon which is configured to automatically and repeatedly transmit BLE radio signals containing positioning support information like an advertisement signal containing and/or representing an UUID of the BLE beacon transmitting the advertisement signal. Alternatively or additionally, one or more of radio nodes 103-1 to 103-3 may be a WLAN access point and/or router which is configured to automatically and repeatedly transmit WLAN radio signals containing positioning support information like a periodically transmitted beacon signal containing and/or representing an SSID of the WLAN of the WLAN access point and/or router transmitting the beacon signal.

In system 100, indoor radio positioning server 101 and mobile devices 102-1 to 102-3 may be configured to communicate with each other as indicated by communication paths 104-1, 104-2 and 104-3, respectively. It is to be understood that communication paths 104-1 to 104-3 may comprise one or more communication links (e.g. one or more wireless communication links or one or more wireline communication links or a combination thereof). Communication paths 104-1 to 104-3 are for example communication paths over a cellular communication system like a 2G/3G/4G/5G cellular communication system. The 2G/3G/4G/5G cellular radio communication standards are developed by the 3GPP and presently available under http://www.3gpp.org/.

Moreover, indoor radio positioning server 101 may be configured for generating and/or updating an indoor radio positioning map for the indoor environment. For example, the indoor radio positioning map is configured to enable each of the mobile devices 102-1 to 102-3 to estimate its position at least partially based on this indoor radio positioning map when the respective mobile device is located in the indoor environment. For example, the indoor radio positioning map is represented by indoor radio positioning map information which may be transmitted from the indoor radio positioning server 101 to the mobile devices 102-1 to 102-3.

The indoor radio positioning map may be a radio coverage map of the indoor environment which represents at least the expected radio coverage of the radio nodes 103-1 to 103-3 that are installed in the indoor environment. The radio coverage model of such a radio node may describe the area (e.g. the area of the indoor environment) within which a radio signal transmitted or triggered to be transmitted by this radio node is expected to be observable (e.g. receivable with a minimum quality). The real radio coverage of such a radio node may however deviate from the expected radio coverage as described by such a radio coverage model. As disclosed in more detail above, a radio coverage model of a radio node may be a hard-boundary model or a soft-boundary model (e.g. a hard-boundary model or a soft-boundary model describing expected radio coverage).

The indoor radio positioning server 101 may be configured for transmitting indoor radio positioning map information representing the indoor radio positioning map to the mobile devices 102-1 to 102-3 (e.g. via the communication paths 104-1, 104-2 and 104-3, respectively). The mobile devices 102-1 to 102-3 may then use this indoor radio positioning map information for estimating their position based on radio signals received from the radio nodes 103-1 to 103-2 when they are located in the indoor environment.

Mobile devices 102-1 to 102-3 may be configured for collecting radio fingerprint observation reports for updating and/or generating the indoor radio positioning map for the indoor environment and for transmitting the collected radio fingerprint observation reports to the indoor radio positioning server 101 (e.g. via the communication paths 104-1, 104-2 and 104-3, respectively). The indoor radio positioning server 101 may use these radio fingerprint observation reports for generating and/or updating the indoor radio positioning map.

Figure 1B:
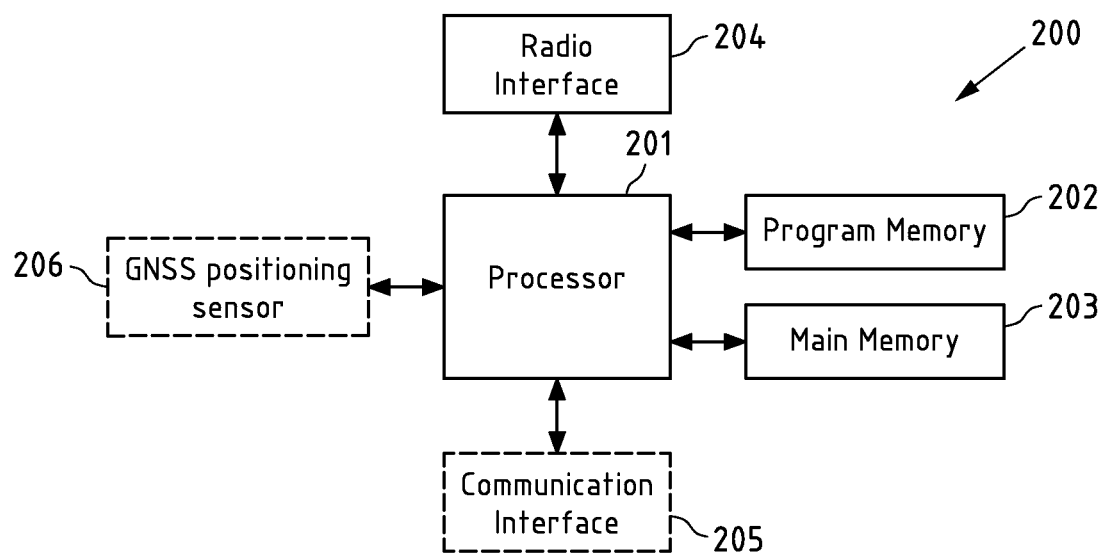
FIG. 1b is a block diagram of an exemplary embodiment of an apparatus according to the disclosure.

FIG. 1b is a block diagram of an exemplary embodiment of an apparatus in form of a mobile device 200 according to the disclosure. In the following, it is assumed that mobile device 200 is one of the mobile devices 102-1 to 102-3 of system 100 of FIG. 1a. For example, mobile device 200 may be one of a smartphone, a tablet computer, a notebook computer, a smart watch and a smart band.

Mobile device 200 comprises a processor 201. Processor 201 may represent a single processor or two or more processors, which are for instance at least partially coupled, for instance via a bus. Processor 201 executes a program code stored in program memory 202 (for instance program code causing mobile device 200 to perform one or more of the embodiments of a method according to the disclosure or parts thereof (e.g. the method or parts of the method described below with reference to FIG. 2), when executed on processor 201), and interfaces with a main memory 203. Program memory 202 may also contain an operating system for processor 201. Some or all of memories 202 and 203 may also be included into processor 201.

One of or both of a main memory and a program memory of a processor (e.g. program memory 202 and main memory 203 and/or program memory 302 and main memory 303 as described below with reference to FIG. 1c) could be fixedly connected to the processor (e.g. processor 201 and/or processor 301) or at least partially removable from the processor, for instance in the form of a memory card or stick.

A program memory (e.g. program memory 202 and/or program memory 302 as described below with reference to FIG. 1c) may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable from, for instance in the form of a removable SD memory card.

A main memory (e.g. main memory 203 and/or main memory 303 as described below with reference to FIG. 1c) may for instance be a volatile memory. It may for instance be a DRAM memory, to give non-limiting example. It may for instance be used as a working memory for processor 201 when executing an operating system and/or programs.

Processor 201 further controls a radio interface 204 configured to receive and/or output data and/or information. For instance, radio interface 204 may be configured to receive radio signals from a radio node (e.g. one of radio nodes 103-1 to 103-2 of system 100 of FIG. 1a). The radio interface 204 is configured to scan for radio signals that are broadcast by nodes 103-1 to 103-2 of system 100 of FIG. 1a. Furthermore, the radio interface 204 may be configured for evaluating (e.g. taking measurements on the received radio signals like measuring a received signal strength) and/or extracting data or information from the received radio signals. It is to be understood that any computer program code based processing required for receiving and/or evaluating radio signals may be stored in an own memory of radio interface 204 and executed by an own processor of radio interface 204 or it may be stored for example in memory 203 and executed for example by processor 201.

For example, the radio interface 204 may at least comprise a BLE radio interface including at least a BLE receiver (RX). The BLE receiver may be a part of a BLE transceiver. It is to be understood that the disclosure is not limited to BLE or Bluetooth. For example, radio interface 204 may additionally or alternatively comprise a WLAN radio interface including at least a WLAN receiver (RX). The WLAN receiver may also be a part of a WLAN transceiver.

Moreover, processor 201 controls a further communication interface 205 which is for example configured to communicate according to a cellular communication system like a 2G/3G/4G/5G cellular communication system. Mobile device 200 may use communication interface 205 to communicate with indoor radio positioning server 101 of system 100 (e.g. via one of communication paths 104-1 to 104-3).

Furthermore, processor 201 may control an optional GNSS positioning sensor 206 (e.g. a GPS sensor). GNSS positioning sensor may be configured to receive satellite signals of a GNSS system (e.g. GPS satellite signals) and to determine a position of the mobile device (e.g. a current position of the mobile device) at least partially based on satellite signals of the GNSS system that are receivable at this position.

The components 202 to 206 of server 100 may for instance be connected with processor 201 by means of one or more serial and/or parallel busses.

It is to be understood that mobile device 200 may comprise various other components. For example, mobile device 200 may optionally comprise a user interface (e.g. a touch-sensitive display, a keyboard, a touchpad, a display, etc) or one or more inertial sensors (e.g. an accelerometer, a gyroscope, a magnetometer, a barometer, etc.).

Figure 1C:
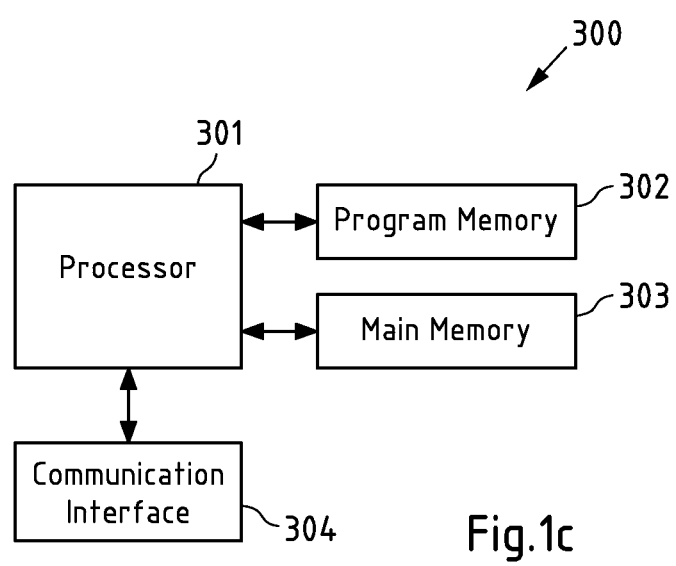
FIG. 1c is a block diagram of another exemplary embodiment of an apparatus according to the disclosure.

FIG. 1c is a block diagram of an exemplary embodiment of an apparatus in form of an indoor radio positioning server 300 according to the disclosure. In the following, it is assumed that indoor radio positioning server 300 is indoor radio positioning server 101 of system 100 of FIG. 1a.

Indoor radio positioning server 300 comprises a processor 301. Processor 301 may represent a single processor or two or more processors, which are for instance at least partially coupled, for instance via a bus. Processor 301 executes a program code stored in program memory 302 (for instance program code causing indoor radio positioning server 300 to perform one or more of the embodiments of a method according to the disclosure or parts thereof (e.g. the method or parts of the method described below with reference to FIG. 2), when executed on processor 301), and interfaces with a main memory 303.

Program memory 302 may also comprise an operating system for processor 301. Some or all of memories 302 and 303 may also be included into processor 301.

Moreover, processor 301 controls a communication interface 304 which is for example configured to communicate according to a cellular communication system like a 2G/3G/4G/5G cellular communication system. Indoor radio positioning server 300 may use communication interface 304 to communicate with mobile devices 102-1 to 102-3 of system 100 (e.g. via one of communication paths 104-1 to 104-3).

The components 302 to 304 of indoor radio positioning server 300 may for instance be connected with processor 301 by means of one or more serial and/or parallel busses.

It is to be understood that indoor radio positioning server 300 may comprise various other components. For example, indoor radio positioning server 300 may optionally comprise a user interface (e.g. a touch-sensitive display, a keyboard, a touchpad, a display, etc).

Figure 2:
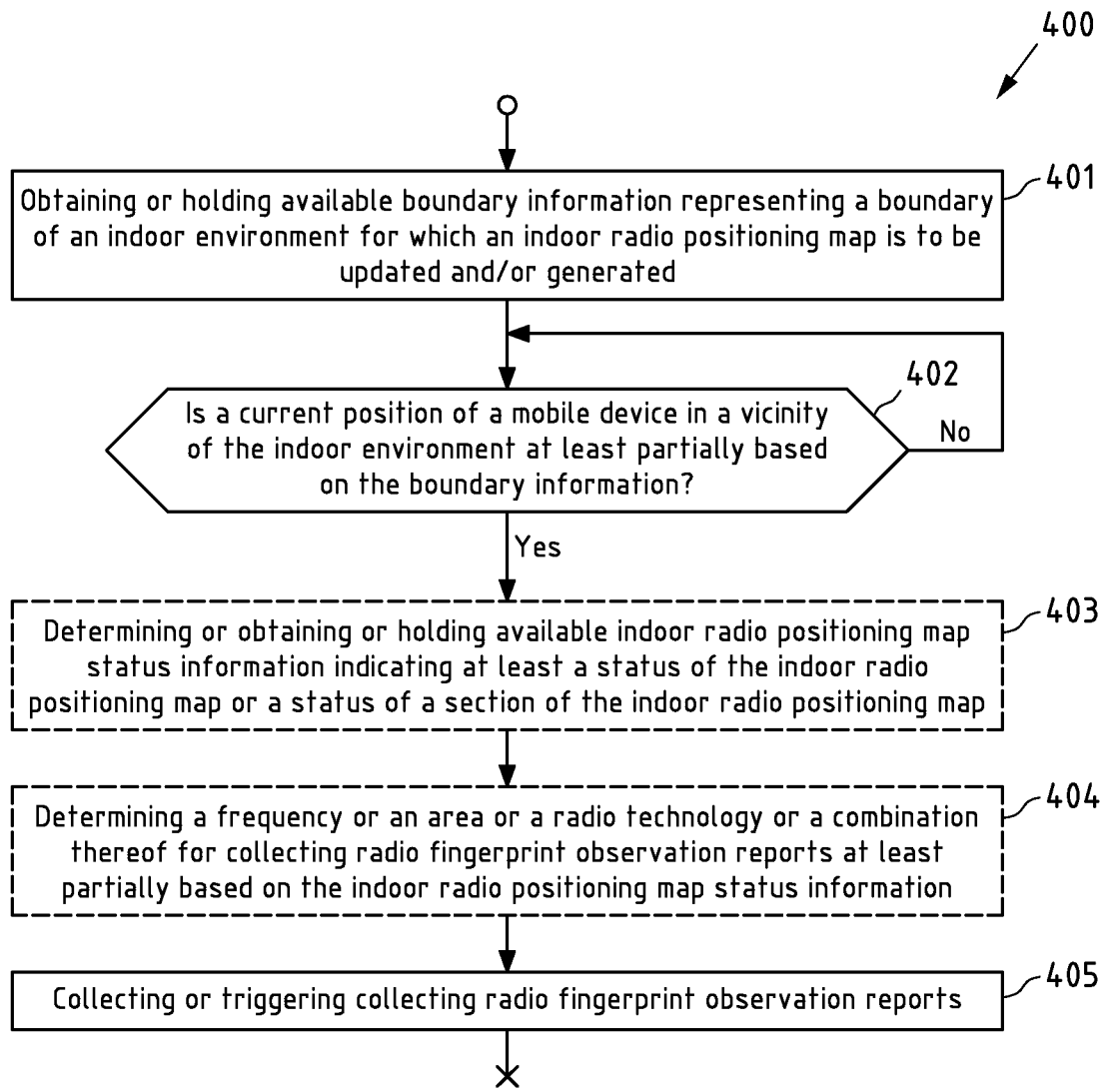
FIG. 2 is a flow chart illustrating an exemplary embodiment of a method according to the disclosure.

FIG. 2 is a flow chart 400 illustrating an exemplary embodiment of a method according to the disclosure. Without limiting the scope of the invention, it is assumed in the following that mobile device 102-1 of indoor radio positioning system 100 as described above with respect to FIG. 1a performs steps 401 to 405 of flow chart 400.

In a step 401, boundary information representing a boundary of the indoor environment (e.g. indoor environment 501 as described below with respect to FIG. 3) of indoor radio positioning system 100 for which an indoor radio positioning map is to be updated and/or generated are obtained or hold available by mobile device 102-1.

For example, mobile device 102-1 may receive the boundary information from indoor radio positioning server 101 via communication paths 104-1 in step 401 (e.g. by means of communication interface 205). Subsequently, mobile device 102-1 may store the boundary information (e.g. in program memory 202).

Furthermore, mobile device 102-1 may receive indoor radio positioning map information representing the indoor radio positioning map for indoor environment of indoor radio positioning system 100 from indoor radio positioning server 101 via communication paths 104-1 in step 401 (e.g. by means of communication interface 205). Subsequently, mobile device 102-1 may store the indoor radio positioning map information (e.g. in program memory 202).

For example, the boundary information may be part of the indoor radio positioning map information. Alternatively, the boundary information may be separate from the indoor radio positioning map information.

As disclosed above, the boundary information may represent a two- or three-dimensional model of the outside walls of the indoor environment of indoor radio positioning system 100. An example of such a two-dimensional model may be a floor plan or a polygon. Additionally, the boundary information may represent the position of the outside walls (i.e. the geographic position). For example, the boundary information may contain one or more geographic coordinates of characteristic features of the outside walls like corners or openings of the outside walls.

Figure 3:
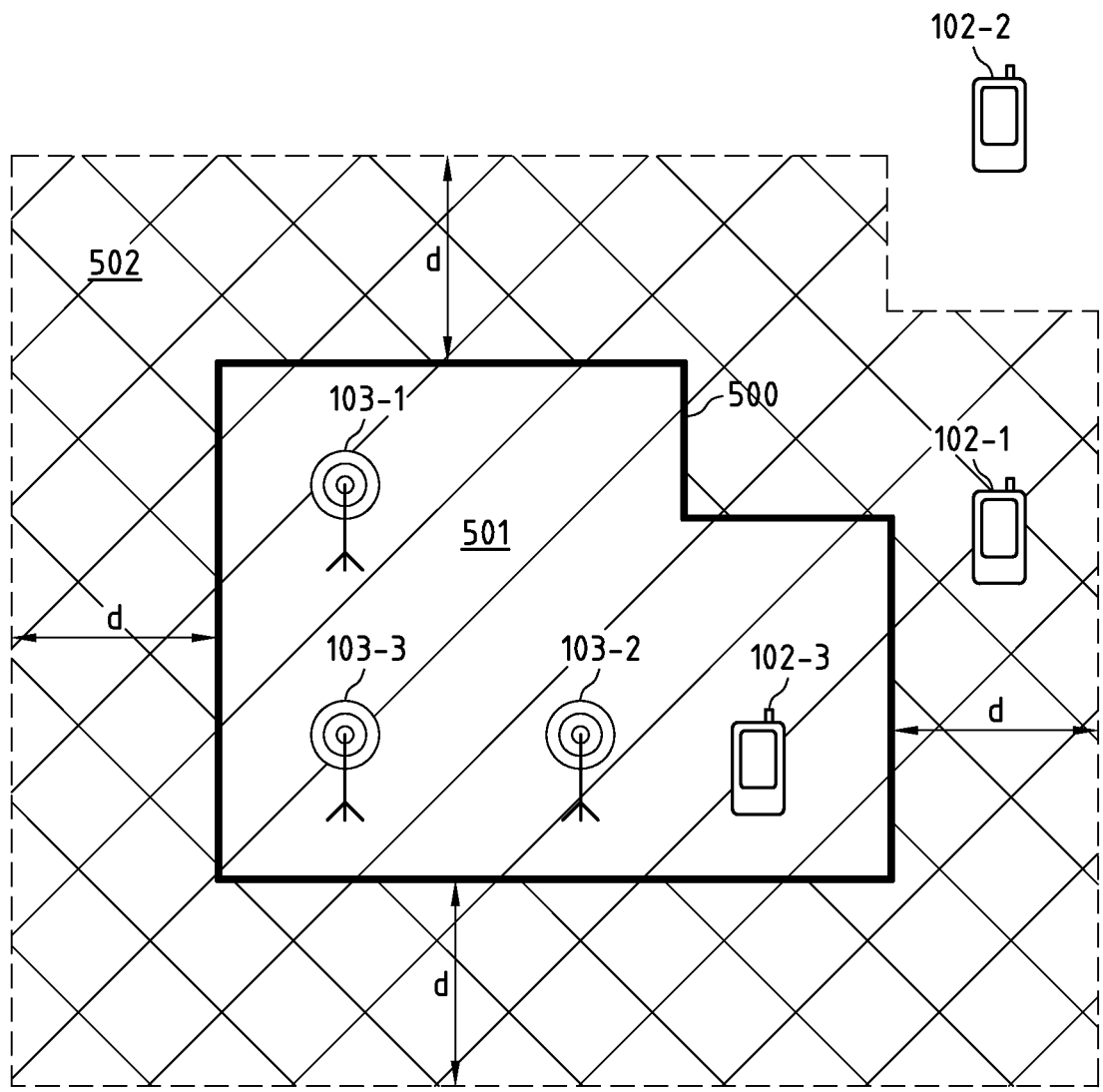
FIG. 3 illustrates an exemplary embodiment of a boundary of an indoor environment as represented by boundary information according to the disclosure.

FIG. 3 illustrates an exemplary embodiment of a boundary 500 of an indoor environment 501 (e.g. a building or a complex of buildings) as represented by the boundary information received in step 401. As apparent from FIG. 3, the boundary 500 of indoor environment 501 is represented as polygon by the boundary information, wherein the edges of the polygon represent the outside walls of indoor environment 501 and the vertices of the polygon represent corners of the outside walls of indoor environment 501. Furthermore, the boundary information may map the polygon to the geographic position of the indoor environment 501 by mapping at least two vertices of the polygon to the geographic position of the corners of the outside walls represented by these vertices (e.g. by specifying the geographic coordinates of these corners of the outside walls).

In the following, it is assumed that indoor radio positioning system 100 is an indoor radio positioning system for indoor environment 501. For illustrative purposes, exemplary positions of radio nodes 103-1 to 103-3 and mobile devices 102-1 to 102-3 are shown in FIG. 3.

In a step 402, it is determined at least partially based on the boundary information whether a current position of mobile device 102-1 is in a vicinity of indoor environment 501.

The vicinity of indoor environment 501 may be understood to describe an area outside of indoor environment 501, for example an area outside boundary 500. For example, the vicinity 502 of indoor environment 501 as shown in FIG. 3 describes the cross-hatched area surrounding indoor environment 501 and having a maximum distance "d" from indoor environment 501.

Accordingly, the current position of mobile device 102-1 may be determined to be in vicinity 502 of indoor environment 501, if a distance between the current position of mobile device 102-1 and boundary 500 of indoor environment 501 (e.g. as represented by the boundary information received in step 401) is less than the maximum distance "d" (i.e. a predetermined threshold distance).

In FIG. 3, the position mobile devices 102-1 may for example be determined to be in vicinity 502 of indoor environment 501, whereas the position of mobile device 102-2 may not be determined to be in vicinity 502 of indoor environment 501.

As disclosed above, the current position of mobile device 102-1 may be understood to be the last outdoor position that has been determined for the mobile device. The real position of the mobile device may however deviate from the current position of the mobile device. For example, the current position of mobile device 102-1 may be determined based on an outdoor positioning system (e.g. by a GNSS positioning system). For example, mobile device 102-1 may determine its current position in or prior to step 402 (e.g. by means of GNSS positioning sensor 206).

If it is determined in step 402 that the current position of mobile device 102-1 is in vicinity 502 of indoor environment 501, the flowchart proceeds further with the next step. Otherwise, step 402 may be repeated, for example by newly determining the current position of mobile device 102-1 and by determining whether this newly determined current position of mobile device 102-1 is in vicinity 501 of indoor environment 501.

Accordingly, the boundary information enables the mobile device 102-1 to determine whether it should collect radio fingerprint observation reports. Without such boundary information, the mobile device 102-1 may be unable to make a decision whether or not to collect radio fingerprint observation reports. This is for example true for the initial stages of learning, for example because there is no indoor positioning radio map available or no radio fingerprint observation reports have been previously collected for the indoor environment.

Furthermore, there is no need to collect radio fingerprint observation reports when the mobile device 102-1 is far away from the indoor environment (e.g. outside the vicinity 502). However, when the mobile device 102-1 is close-by the indoor environment 501 (e.g. in vicinity 502 of indoor environment 501), it may be beneficial to start collecting radio fingerprint observation reports. This type of radio fingerprint observation reports could for example be used to enable a smooth transition between positioning based on the indoor radio positioning system and positioning based on an outdoor positioning system (e.g. a GNSS positioning system).

In an optional step 403, indoor radio positioning map status information indicating at least a status of the indoor radio positioning map or a status of a section of the indoor radio positioning map are determined or obtained or hold available.

By determining or obtaining or holding available the indoor radio positioning map status information by the mobile device 102-1 a feedback loop may be created which informs the mobile device 102-1 about the status (e.g. the learning status) of the indoor radio positioning map. For example, it may allow to inform mobile device 102-1 whether the indoor environment 501 is previously unmapped or whether there have been collected some (but not sufficient) radio fingerprint observation reports (e.g. for one or more specific radio technologies) or whether the indoor environment 501 is already fully radiomapped and radio fingerprint observation reports are only required for verification purposes.

As disclosed above, the status of the indoor radio position map may be understood to indicate whether the indoor radio positioning map is complete or whether further training is necessary to complete or update the indoor radio positioning map. Accordingly, the status of the section of the indoor radio position map may be understood to indicate whether the section of the indoor radio positioning map is complete or whether further training is necessary to complete or update the section of the indoor radio positioning map. Therein, the section of the indoor radio positioning map may represent a specific portion of the indoor radio positioning map. For example, the indoor radio positioning map may consist of a plurality of sections.

For example, the status of the indoor radio position map or of the section of the indoor radio position map may be one of the following:

i) not available (e.g. no radio fingerprint observation reports collected);
ii) incomplete (e.g. less than predetermined number of radio fingerprint observation reports collected and/or expected positioning accuracy is less than predetermined positioning accuracy);
iii) complete (e.g. more than predetermined number of radio fingerprint observation reports collected and/or expected positioning accuracy meets or supersedes predetermined positioning accuracy);
iv) outdated (e.g. the radio environment may have changed).

The indoor radio positioning map status information may for example be determined by determining the status of the indoor radio positioning map or the status of the section of the indoor radio positioning map as disclosed above in more details.

For example, the indoor radio positioning server 101 may determine indoor radio positioning map status information. Accordingly, the mobile device 102-1 may obtain the indoor radio positioning map status information by receiving the indoor radio positioning map status information from indoor radio positioning server 101 via communication paths 104-1 in step 403 (e.g. by means of communication interface 205). Subsequently, mobile device 102-1 may store the indoor radio positioning map status information (e.g. in program memory 202).

For example, the indoor radio positioning map status information may be contained (e.g. embedded by the indoor radio positioning server) in the indoor radio positioning map information representing the indoor radio positioning map for the indoor environment 501. In this example, the indoor radio positioning map status information may be received together with the indoor radio positioning map information.

Alternatively or additionally, the indoor radio positioning server 101 may provide the indoor radio positioning map status information for retrieval by mobile device 102-1. Accordingly, the mobile device 102-1 may request the indoor radio positioning map status information from the indoor radio positioning server 101 in step 403 (e.g. by transmitting a request for the indoor radio positioning map status information via communication paths 104-1 to the indoor radio positioning server) and receive the indoor radio positioning map status information (e.g. via communication paths 104-1) from the indoor radio positioning server 101 in response to the request. For example, the indoor radio positioning server 101 may provide a programming interface (e.g. an application programming interface, API) for retrieval of the indoor radio positioning map status information. Accordingly, the mobile device 102-1 may use the programming interface to request the indoor radio positioning map status information.

In an optional step 404, a frequency or an area or a radio technology or a combination thereof is determined for collecting radio fingerprint observation reports at least partially based on the indoor radio positioning map status information.

As disclosed above in more details, the determining a frequency or an area or a radio technology or a combination thereof for collecting the radio fingerprint observation reports may be performed according to predetermined rules and/or predetermined specifications.

The frequency for collecting the radio fingerprint observation reports may specify the number of radio fingerprint observations reports (e.g. per time and/or per area) that are to be collected by the mobile device. For example, the determined frequency for collecting the radio fingerprint observation reports may for example be a maximum frequency or a minimum frequency or an exact frequency with which the mobile device collects the radio fingerprint observation reports (e.g. scans for radio signals and/or generates the radio fingerprint observation reports).

Moreover, the area for collecting the radio fingerprint observation reports may specify the area within which radio fingerprint observation reports are to be collected by the mobile device. For example, if the indoor radio positioning map status information indicate that (e.g. only) a section of the indoor radio positioning map is not available or incomplete or outdated, the area (e.g. the area of the indoor environment) represented by this section of the indoor radio positioning map may be determined for collecting the radio fingerprint observation reports may be.

Furthermore, the radio technology for collecting the radio fingerprint observation reports may specify the radio technology for which radio fingerprint observation reports are to be collected by the mobile device (e.g. by scanning for radio signals of this radio technology).

For example, when there have not been collected any radio fingerprint observation reports for the indoor environment, it may be advantageous to collect as much radio fingerprint observation reports as possible. Accordingly, a maximum frequency for collecting the radio fingerprint observation reports may be determined if the indoor radio positioning map status information indicate that the indoor radio positioning map status is not available. In contrast, if there already exists a high quality indoor radio positioning map (e.g. a complete indoor radio positioning map), it may be advantageous from the infrastructure perspective (in order to reduce the consumption of resources such as storage and processing power) not to collect too much radio data. Thus, a minimum frequency for collecting the radio fingerprint observation reports may be determined if the indoor radio positioning map status information indicates that the indoor radio positioning map status is complete. The minimum frequency may for example be predetermined such that it is expected to enable detection of changes of the radio environment of indoor environment 501 (e.g. when one of radio nodes 103-1 to 103-3 is moved or switched off).

In a step 405, radio fingerprint observation reports are collected or triggered to be collected.

For example, mobile device 102-1 may collect radio fingerprint observation reports in step 405 by generating the radio fingerprint observation reports at least partially based on scanning results. For example, collecting a radio fingerprint observation report by mobile device 102-1 may comprise scanning for radio signals observable at an observation position of the mobile device and generating a radio fingerprint observation report containing an indication for the radio nodes from which a radio signal is observable at the observation position of the mobile device and an indication of the observation position of the mobile device. A radio signal may be understood to be observable at an observation position of the mobile device if the radio positioning support signal is receivable with a minimum quality (e.g. a minimum signal-to-noise ratio and/or a minimum signal power) at this position.

The mobile device may collect the radio fingerprint observation reports in step 405 according to the frequency and/or the area and/or the radio technology determined in step 404 for collecting the radio fingerprint observation reports.

Mobile device 102-1 may transmit the collected radio fingerprint observation reports via communication paths 104-1 to indoor radio positioning server 101. The indoor radio positioning server 101 may use the collected radio fingerprint observation reports for updating and/or generating the indoor radio positioning map.

To summarize, the disclosure inter-alia provides a mechanism to control collecting radio fingerprint observation reports.

It is to be understood that the orders of the steps 401 to 405 of flowchart 400 is only exemplary and that the steps may also have a different order if possible. Furthermore, it is also possible that two or more steps may be performed in one step. For example, steps 401 and 403 may be performed in one step when the boundary information and the indoor radio positioning map status information are part of the indoor radio positioning map information.

Figure 4:
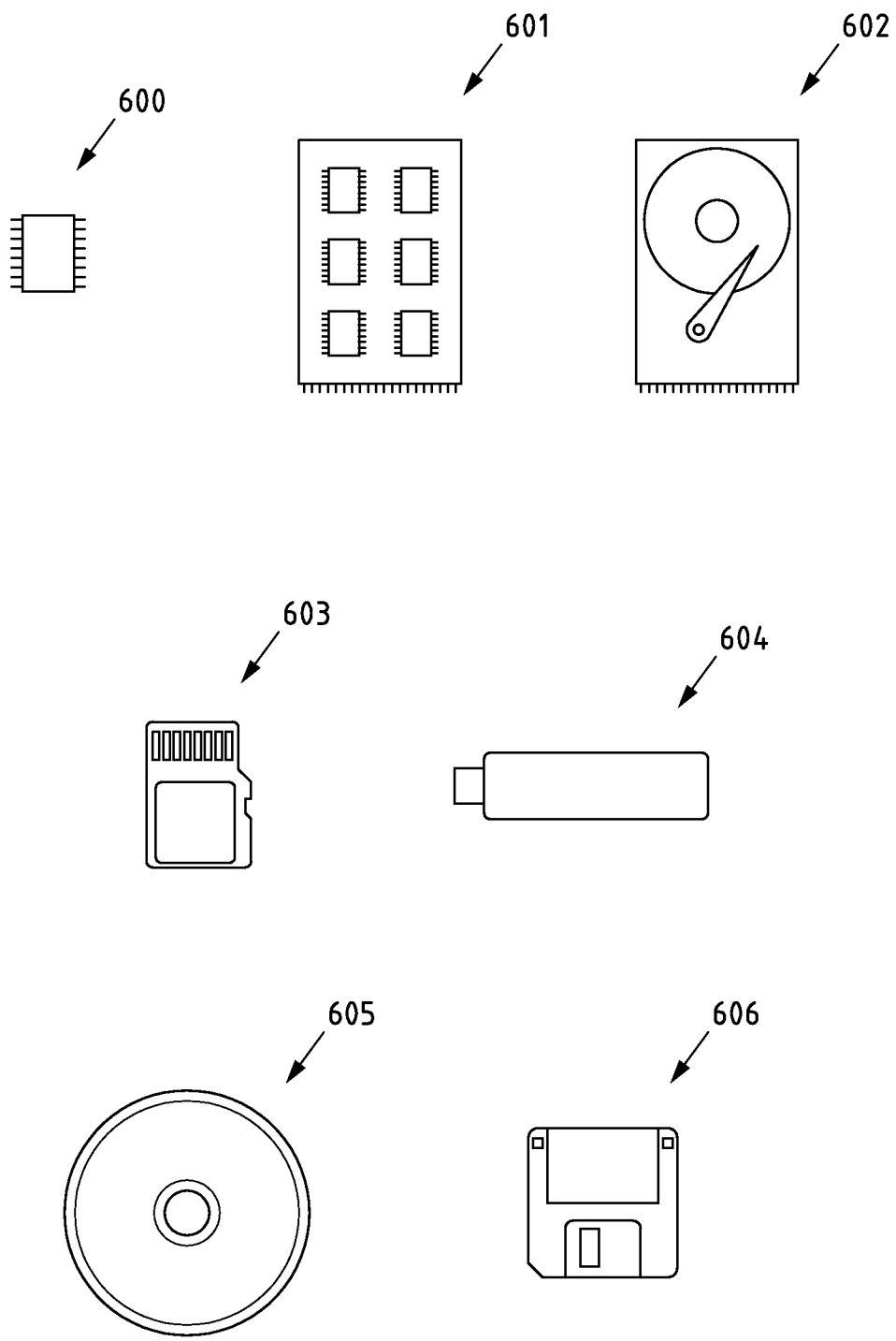
FIG. 4 is a schematic illustration of examples of tangible and non-transitory storage media according to the disclosure.

FIG. 4 is a schematic illustration of examples of tangible and non-transitory computer-readable storage media according to the present disclosure that may for instance be used to implement program memory 202 of FIG. 1b or memory 302 of FIG. 1c. To this end, FIG. 4 displays a flash memory 600, which may for instance be soldered or bonded to a printed circuit board, a solid-state drive 601 comprising a plurality of memory chips (e.g. Flash memory chips), a magnetic hard drive 602, a Secure Digital (SD) card 603, a Universal Serial Bus (USB) memory stick 604, an optical storage medium 605 (such as for instance a CD-ROM or DVD) and a magnetic storage medium 606.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to sections of processor(s)/software (including digital signal processor(s)), software, and memory(ies) that work together to cause an apparatus, such as a mobile phone, to perform various functions) and (c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 201 and 301 of FIGS. 1*b* and 1*c*, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. A method comprising:
   obtaining or holding available boundary information representing boundary of an indoor environment for which an indoor radio positioning map is to be updated or generated;
   determining whether a current position of a mobile device is outside of said indoor environment and within a predetermined distance of said indoor environment at least partially based on said boundary information;
   determining a status of said indoor radio positioning map or of a section of said indoor radio positioning map, wherein the status indicates availability and completeness of said indoor radio positioning map or the section of said indoor radio positioning map;
   determining a frequency or an area or a radio technology or a combination thereof for collecting radio fingerprint observation reports at least partially based on the status of said indoor radio positioning map or of the section of said indoor radio positioning map; and
   in response to determining that said current position of said mobile device is outside of said indoor environment based on the boundary of said indoor environment and within a predetermined distance of said indoor environment, collecting or triggering collection, by the mobile device, of the radio fingerprint observation reports outside of said indoor environment, wherein said radio fingerprint observation reports are collected for updating or generating said indoor radio positioning map.

2. The method according to claim 1, said method comprising:
   determining or obtaining or holding available indoor radio positioning map status information indicating at least said status of said indoor radio positioning map or said section of said indoor radio positioning map.

3. The method according to claim 1, said method comprising:
   obtaining or holding available radio fingerprint observation control information indicating the frequency or the area or the radio technology or a combination for collecting said radio fingerprint observation reports.

4. The method according to claim 1, wherein each of said radio fingerprint observation reports indicates an observation position and one or more respective radio nodes from which radio signals are observable at said observation position by said mobile device.

5. The method according to claim 1, wherein each of said radio fingerprint observation reports contains or represents information enabling determination of an observation position.

6. The method according claim 1, wherein said current position of said mobile device is determined based on an outdoor positioning system.

7. The method according to claim 1, wherein said current position of said mobile device is determined to be in said vicinity of said indoor environment, if a distance between said current position of said mobile device and said boundary of said indoor environment represented by said boundary information is less than a predetermined threshold distance.

8. The method according to claim 1, wherein said radio fingerprint observation reports are collected inside and outside of said indoor environment.

9. The method according to claim 1, said method comprising:
   updating or generating or triggering updating or generating said indoor radio positioning map at least partially based on said radio fingerprint observation reports.

10. A non-transitory computer readable storage medium in which computer program code is stored, the computer program code when executed by a processor causing at least one apparatus to perform:

obtaining or holding available boundary information representing boundary of an indoor environment for which an indoor radio positioning map is to be updated or generated;

determining whether a current position of a mobile device is outside of said indoor environment and within a predetermined distance of said indoor environment at least partially based on said boundary information;

determining a status of said indoor radio positioning map or of a section of said indoor radio positioning map, wherein the status indicates availability and completeness of said indoor radio positioning map or the section of said indoor radio positioning map;

determining a frequency or an area or a radio technology or a combination thereof for collecting radio fingerprint observation reports at least partially based on the status of said indoor radio positioning map or of the section of said indoor radio positioning map; and if it is determined that said current position of said mobile device is outside of said indoor environment based on the boundary of said indoor environment and within a predetermined distance of said indoor environment, collecting or triggering collecting radio fingerprint observation reports outside of said indoor environment by said mobile device, wherein said radio fingerprint observation reports are collected for updating or generating said indoor radio positioning map.

11. An apparatus, said apparatus comprising at least one processor and at least one memory containing computer program code, the at least one memory and the computer program code configured to, with the at least one processor, cause said apparatus at least to perform:

obtaining or holding available boundary information representing boundary of an indoor environment for which an indoor radio positioning map is to be updated or generated;

determining whether a current position of a mobile device is outside of said indoor environment based on the boundary of said indoor environment and within a predetermined distance of said indoor environment at least partially based on said boundary information;

determining a status of said indoor radio positioning map or of a section of said indoor radio positioning map, wherein the status indicates availability and completeness of said indoor radio positioning map or the section of said indoor radio positioning map;

determining a frequency or an area or a radio technology or a combination thereof for collecting radio fingerprint observation reports at least partially based on the status of said indoor radio positioning map or of the section of said indoor radio positioning map; and if it is determined that said current position of said mobile device is outside of said indoor environment and within a predetermined distance of said indoor environment, collecting or triggering collecting radio fingerprint observation reports by said mobile device outside of said indoor environment, wherein said radio fingerprint observation reports are collected for updating or generating said indoor radio positioning map.

12. The apparatus according to claim 11, said at least one memory and said computer program code further configured to, with said at least one processor, cause said apparatus to perform:

determining or obtaining or holding available indoor radio positioning map status information indicating at least said status of said indoor radio positioning map or of said section of said indoor radio positioning map.

13. The apparatus according to claim 11, said at least one memory and said computer program code further configured to, with said at least one processor, cause said apparatus to perform:

obtaining or holding available radio fingerprint observation control information indicating the frequency or the area or the radio technology or a combination for collecting said radio fingerprint observation reports.

14. The apparatus according to claim 11, wherein each of said radio fingerprint observation reports indicates an observation position and one or more respective radio nodes from which radio signals are observable at said observation position by said mobile device.

15. The apparatus according to claim 11, wherein each of said radio fingerprint observation reports contains or represents information enabling determination of an observation position.

16. The apparatus according to claim 11, wherein said current position of said mobile device is determined based on an outdoor positioning system.

17. The apparatus according to claim 11, wherein said current position of said mobile device is determined to be in said vicinity of said indoor environment, if a distance between said current position of said mobile device and said boundary of said indoor environment represented by said boundary information is less than a predetermined threshold distance.

18. The apparatus according to claim 11, wherein said radio fingerprint observation reports are collected inside and outside of said indoor environment.

19. The apparatus according to claim 11, said at least one memory and said computer program code further configured to, with said at least one processor, cause said apparatus to perform:

updating or generating or triggering updating or generating said indoor radio positioning map at least partially based on said radio fingerprint observation reports.

20. The apparatus according to claim 11, wherein said apparatus is one of a mobile device and an indoor radio positioning server.

21. The method according to claim 1, wherein said radio fingerprint observation reports are collected at least in accordance with the determined frequency, area, radio technology, or combination thereof.

22. The non-transitory computer readable storage medium according to claim 10, wherein said radio fingerprint observation reports are collected at least in accordance with the determined frequency, area, radio technology, or combination thereof.

23. The non-transitory computer readable storage medium according to claim 1, wherein said radio fingerprint observation reports are collected inside and outside of said indoor environment.

24. The apparatus according to claim 1, wherein said radio fingerprint observation reports are collected at least in accordance with the determined frequency, area, radio technology, or combination thereof.

* * * * *